(12) United States Patent
Ngai (10) Patent No.: US 7,363,417 B1
(45) Date of Patent: *Apr. 22, 2008

(54) OPTIMIZED TOPOGRAPHIES FOR DYNAMIC ALLOCATION OF PCI EXPRESS LANES USING DIFFERENTIAL MUXES TO ADDITIONAL LANES TO A HOST

(75) Inventor: Henry P. Ngai, Coto De Caza, CA (US)

(73) Assignee: Pericom Semiconductor Corp., San Jose, CA (US)

( * ) Notice: Subject to any disclaimer, the term of this patent is extended or adjusted under 35 U.S.C. 154(b) by 294 days.

This patent is subject to a terminal disclaimer.

(21) Appl. No.: 11/161,612

(22) Filed: Aug. 9, 2005

Related U.S. Application Data (63) Continuation-in-part of application No. 10/904,880, filed on Dec. 2, 2004, now Pat. No. 7,174,411.

(51) Int. Cl.
*G06F 13/00* (2006.01)
(52) U.S. Cl. ............... 710/316; 710/317; 710/305; 710/307
(58) Field of Classification Search ........ 710/300–317, 710/62–64, 72, 8–19, 104–105
See application file for complete search history.

(56) References Cited

U.S. PATENT DOCUMENTS

| | | | |
|---|---|---|---|
| 4,490,788 A | 12/1984 | Rasmussen | 710/21 |
| 5,144,293 A | 9/1992 | Rouse | 340/825.02 |
| 5,613,141 A | 3/1997 | Szatkowski et al. | 710/2 |
| 5,974,058 A | 10/1999 | Burns et al. | 370/538 |
| 6,154,797 A | 11/2000 | Burns et al. | 710/52 |
| 6,301,637 B1 | 10/2001 | Krull et al. | 711/112 |
| 6,556,628 B1 | 4/2003 | Poulton et al. | 375/257 |
| 6,754,757 B1 | 6/2004 | Lewis | 710/301 |
| 7,174,411 B1 * | 2/2007 | Ngai | 710/316 |

* cited by examiner

*Primary Examiner*—Raymond N Phan
(74) *Attorney, Agent, or Firm*—gPatent LLC; Stuart T. Auvinen (57) ABSTRACT

Many Peripheral Component Interconnect Express (PCIE) lanes are available between a root complex host and peripherals inserted into slots. Each PCIE lane is a bi-directional serial bus, with a transmit differential pair and a receive differential pair of data lines. Some lanes are directly connected from the root complex host to each slot. Each slot is driven by a different port and a different direct physical layer on the host. Other lanes are configurable and can be driven by any port and use a configurable physical layer on the host. These configurable lanes pass through an external switch or crossbar that connects the lanes from the host to one or more of the slots. The direct-connect lanes can be the first lanes to a slot while the configurable lanes are the higher-numbered lanes.

19 Claims, 10 Drawing Sheets

PRIOR ART

FIG. 3

PRIOR ART

PRIOR ART

OPTIMIZED TOPOGRAPHIES FOR DYNAMIC ALLOCATION OF PCI EXPRESS LANES USING DIFFERENTIAL MUXES TO ADDITIONAL LANES TO A HOST

RELATED APPLICATION

This application is a continuation-in-part of the application for "Dynamic Allocation of PCI Express Lanes Using a Differential Mux to an Additional Lane to a Host", U.S. Ser. No. 10/904,880, filed Dec. 2, 2004 now U.S. Pat. No. 7,174,411.

FIELD OF THE INVENTION

This invention relates to serial buses, and more particularly to allocation of multiple serial buses in a system.

BACKGROUND OF THE INVENTION

Personal computers (PC's) and other systems use serial buses such as RS-232. Standardized serial buses such as Peripheral Component Interconnect Express (PCIE) allow for interoperability of a wide variety of peripherals that can be inserted into bus expansion slots in a PC.

Serial buses that use differential data lines can have high data rates, as small voltage differences between the two data lines can be detected by receivers. Noise immunity is increased since noise that is coupled into both data lines does not affect the differential signal.

Figure 1:
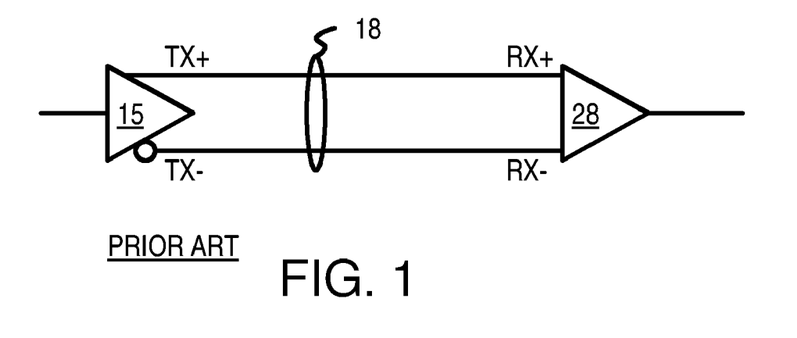
FIG. 1 shows a differential serial bus.

FIG. 1 shows a differential serial bus. Transmitter 15 receives a stream of data and drives a voltage difference onto wires TX+, TX− in host-transmit pair 18 to represent the data. Receiver 28 compares the voltage on TX+ to the voltage on TX− and generates an output signal to represent the data. The transmitter's output TX+ is the same line or wire as input RX+ for receiver 28, and output TX− is connected to input RX−. A cable containing host-transmit pair 18 may also have power and ground wires and one or more other pairs.

Figure 2:
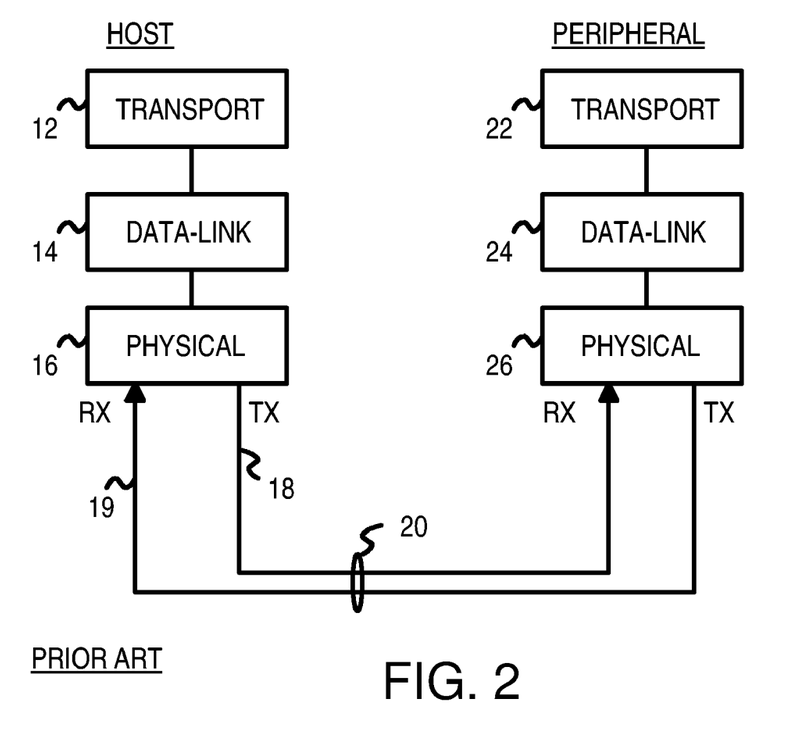
FIG. 2 shows a protocol-layer diagram of a system with a serial bus.

FIG. 2 shows a protocol-layer diagram of a system with a serial bus. Serial bus 20 has two differential pairs. Host-transmit pair 18 contains two data wires (TX+, TX−) that connect from the transmit Tx outputs of host physical layer 16 to the receive Rx inputs of peripheral physical layer 26. The host sends data to the peripheral over serial bus 20 using host-transmit pair 18. Host physical layer 16 generates differential signals on the two data wires of host-transmit pair 18 while peripheral physical layer 26 has a differential receiver. Host data is arranged in packets by host transport layer 12 and a link to the peripheral established by data link layer 14. Physical layers 16, 26 perform framing, indicating the beginning and end of a frame or packet. Data link layers 14, 24 add and check sequence numbers and checksums to ensure that a packet is received properly and without error.

For reply data from the peripheral to the host, host-receive pair 19 is used. Peripheral data is transmitted as differential data by peripheral physical layer 26 and received by a differential receiver in host physical layer 16.

PCIE is a point-to-point bus protocol, so each serial bus can have only two endpoints. Since each serial bus can carry only a limited bandwidth of data, PCIE allows for multiple serial buses to be placed in parallel between a host and a peripheral. Each serial bus between the host and a peripheral is known as a lane. A higher-bandwidth peripheral can be allocated more lanes than a slower peripheral.

Figure 3:
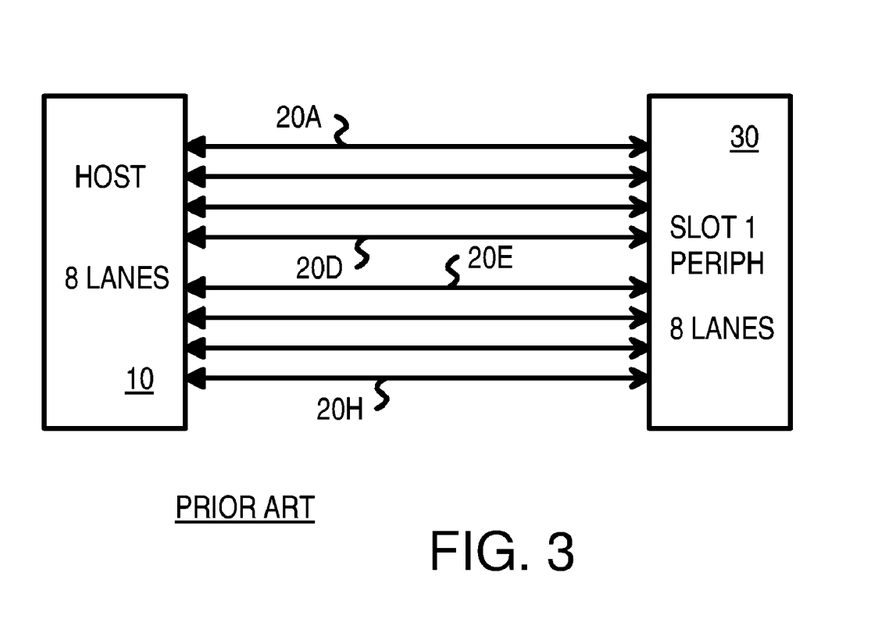
FIG. 3 shows a host connecting to a peripheral over 8 lanes.

FIG. 3 shows a host connecting to a peripheral over 8 lanes. Host 10 has 8 bi-directional serial buses, or lanes available. Lanes 20A-20H connect to peripheral 30, allowing the bandwidth to be increased by a factor of 8 relative to a single serial bus. Lanes 20A-20H can each be a serial bus with two differential pairs that follow the PCIE specification. Peripheral 30 can be a removable card or device plugged into an expansion slot or connector, or could be fixed in place.

Figure 4:
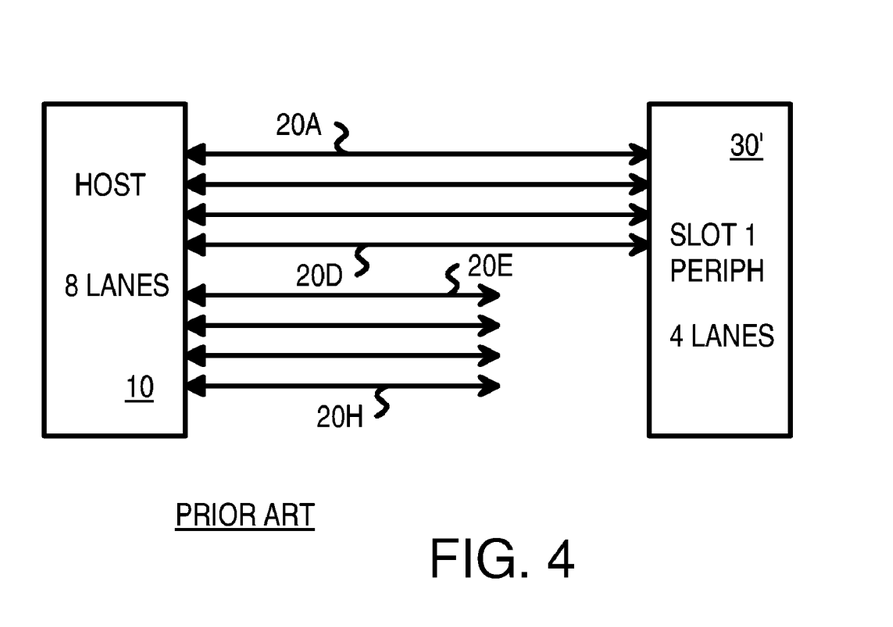
FIG. 4 shows a peripheral that uses only half its available lanes.

FIG. 4 shows a peripheral that uses only half its available lanes. Peripheral 30' is plugged into slot 1, which has connections for 8 lanes from host 10. However, peripheral 30' only supports 4 lanes, since it has only 4 serial-bus connections. The first four lanes 20A-20D from host 10 connect to peripheral 30' in slot 1, but the other 4 lanes 20E-20H from host 10 to slot 1 are not used, since peripheral 30' only has 4 serial-bus transceivers. During initialization, negotiation occurs between host 10 and peripheral 30' to determine the maximum number of lanes between the two device endpoints, which is the smaller number of lanes supported by either host 10 or peripheral 30'.

In a traditional parallel bus, signals could connect to other slots and be used by other peripherals. However, the timing requirements of high-speed serial buses such as PCIE require that each bus have only 2 endpoints. Thus each serial bus lane can connect from the host to only one slot. When the peripheral inserted into the slot does not use all serial-bus lanes, then the remaining unused lanes cannot be used by other peripherals in other slots. Thus the four lanes 20E-20H are wasted.

Although serial-bus lanes can have only two endpoints, one of the endpoints could be a bus switch. The bus switch can receive signals from the serial bus lane and re-transmit the signals over a second serial-bus segment. Such bus switches could allow lanes from a host to connect to different slots, based on the needs of the peripherals in those slots.

A software-based bus switch that connects serial buses together may be constructed by using switching software at or above the transport layer (See FIG. 2). The switching software can forward data from one physical layer to another physical layer. However, transport-layer switches can be slow since data must be passed up through the physical, data-link, and transport layers, and then back down from the transport layer to the data-line and physical layers. A physical-layer bus switch may provide for faster data transmission with reduced switch latency.

While such a bus switch is useful, some possible combinations of peripherals can have less than optimal lane allocations. For example, when one peripheral is a 16-lane peripheral, no lanes might remain for another peripheral in slot 2. When the second peripheral is a slow peripheral, it might be desirable to allocate just one lane to this peripheral, with the remaining lanes allocated to the first peripheral. However, the first peripheral may not be able so support an odd number of lanes, since the number of lanes for a peripheral are defined to be 1, 2, 4, 8, 12, 16, or 32. Thus the first peripheral could not support 15 lanes, and would have to drop back to using only 12 lanes, with the remaining 3 lanes being unused.

The parent application disclosed adding an extra serial-bus lane to the host to allow for much more efficient allocations of serial-bus lanes to peripheral slots. The additional host lane gives the host an odd number of lanes, such as 9, 17, 33, 65, etc. A physical-layer bus switch device was also disclosed that can include an extra switch to mux in this extra lane to the peripheral slots. The extra switch can be in a backwards orientation relative to the other bus switches.

Figure 5:
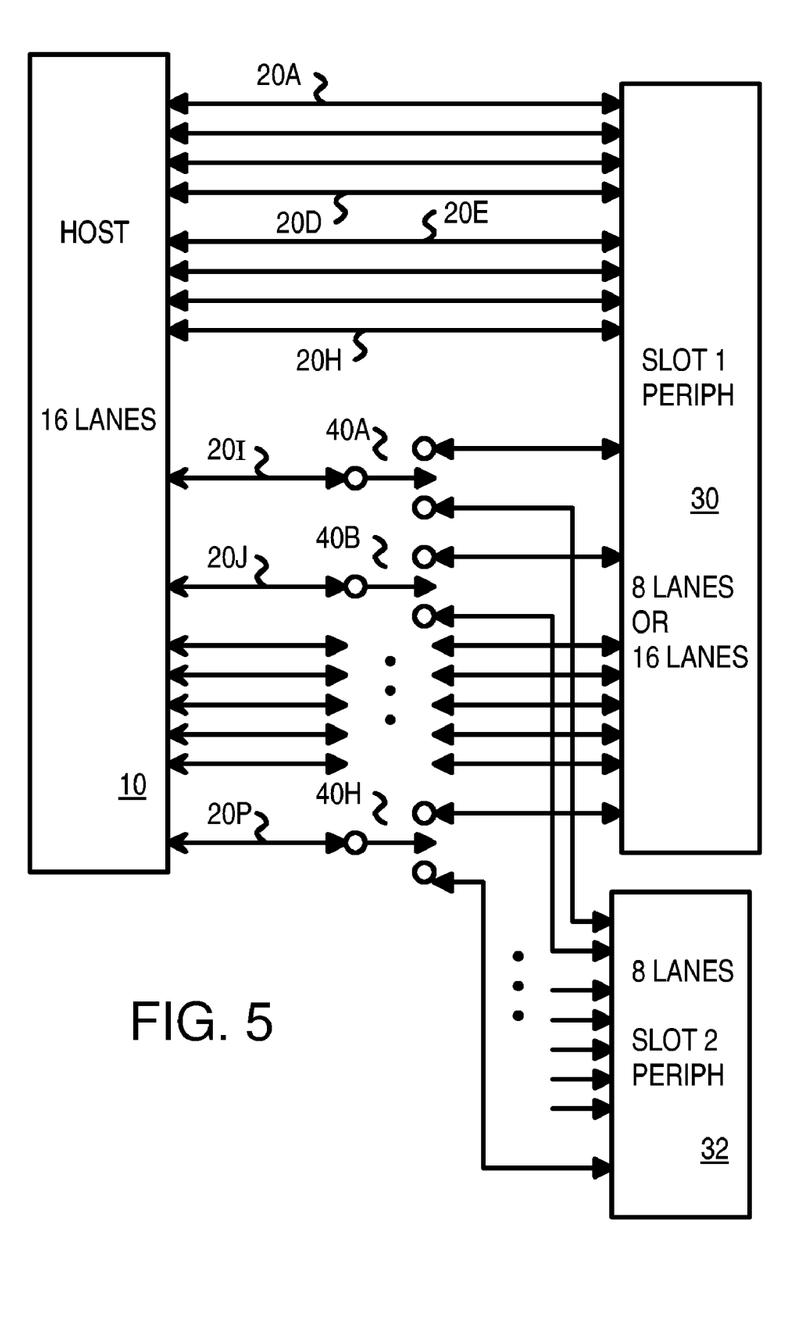
FIG. 5 shows a bus switch between a host and peripheral slots for allocating lanes according to the parent application.

FIG. 5 shows a bus switch between a host and peripheral slots for allocating lanes according to the parent application. A physical-layer bus switch may provide for faster data transmission with a reduced switch latency. Host 10 has a total of 16 available. Each of lane 20A-20P has two differential data pairs. Peripheral 30 in slot 1 can have either 8 or 16 lanes, depending on the type of peripheral inserted into the slot. Negotiation and configuration when peripheral 30 is inserted into slot 1, or at system boot-up, can be performed to determine the number of lanes to use.

The first 8 lanes 20A-20H are hardwired to slot 1. These lanes can only connect to peripheral 30. Should peripheral 30 need fewer lanes, such as 4 or 2 or just 1, the remaining 4, 6, or 7 lanes in lanes 20A-20H are unused.

The other 8 lanes 201-20P from host 10 connect to switches 40A-40H, respectively. Each lane connects to just one switch. Each switch connects to two serial-bus segments to two peripheral slots. Thus the 8 lanes 201-20P can connect host 10 to peripheral 30 slot 1, or to peripheral 32 in slot 2.

For example, lane 201 has a segment from host 10 to switch 40A. Switch 40A can connect this lane from host 10 to either a segment to peripheral 30 in slot 1, or to a different serial-bus segment to peripheral 32 in slot 2. This 9th lane from host 10 can be switched by switch 40A to be the 9th lane input to peripheral 30 in slot 1, or switched to be the first lane input to peripheral 32 in slot 2.

Switches 40A-40H can all be switched together, so that peripheral 30 in slot 1 has 16 lanes and peripheral 32 in slot 2 has no lanes, or so that peripheral 30 in slot 1 has 8 lanes and peripheral 32 in slot 2 has 8 lanes.

Figure 6A:
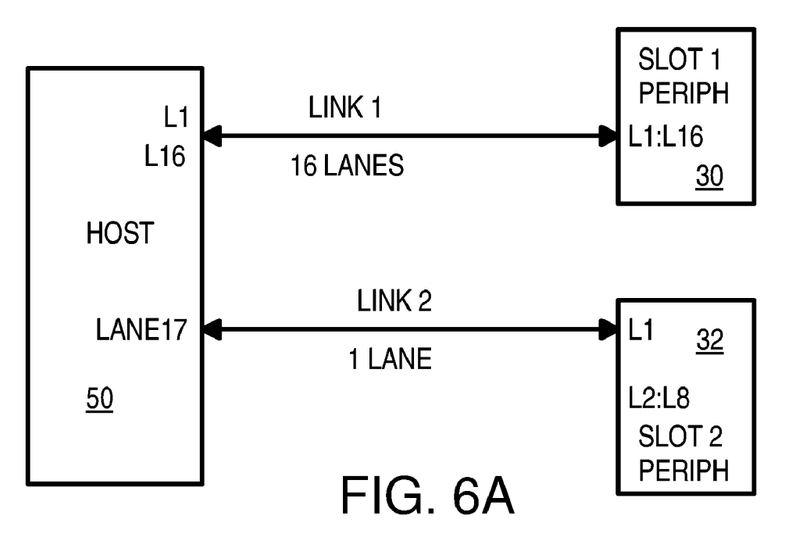
FIG. 6A is a diagram showing a 16-lane logical link and an extra 1-lane link according to the parent application.

FIG. 6A is a diagram showing a 16-lane logical link and an extra 1-lane link according to the parent application. Host 50 creates a first logical link to peripheral 30 in slot 1 using its first 8 lanes L1-L8 and its second 8 lanes L9-L16. Peripheral 30 is configured as 16-lane device.

Lane 17 is used to form a second logic link to peripheral 32 in slot 2. Peripheral 32 could be an 8-lane device that is configured as a 1-lane device when the switch controller or configuration software determines that peripheral 32 is a lower-priority device than peripheral 30, which warrants a full 16 lanes. Peripheral 32 could also be a 1, 2, or 4 lane device.

Figure 6B:
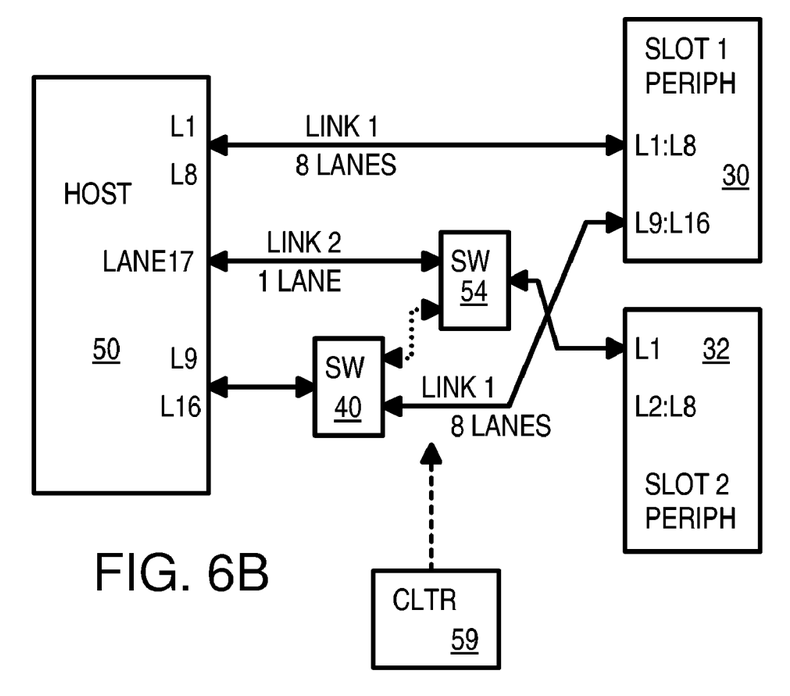
FIG. 6B is a diagram showing switch settings to produce the 16-lane logical link and the extra 1-lane link of FIG. 6A.

FIG. 6B is a diagram showing switch settings to produce the 16-lane logical link and the extra 1-lane link of FIG. 6A. The first link to peripheral 30 is formed by the direct connection of the first 8 lanes from host 50, and by the second 8 lanes from host 50, L9-L16, which connect to switches 40 (switches 40A-40H of FIG. 5) and then to peripheral 30. Switch controller 59 configures switches 40 to connect the 8 segments from host 50 to peripheral 30.

The second link to peripheral 32 is formed through switch 54. Extra lane 17 from host 50 connects to switch 54, which drives the lane-1 I/O of peripheral 32. Switch controller 59 configures switch 54 to select the serial-bus segment from lane 17 of host 50, rather than the segment to switches 40.

While switching the extra lane is useful, further optimizations of the bus and switch arrangements are desirable. What is desired is lane allocation and switch configurations that are optimized for multiple slots and multiple ports.

DETAILED DESCRIPTION

The present invention relates to an improvement in serial-bus lane allocation and switching. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 7:
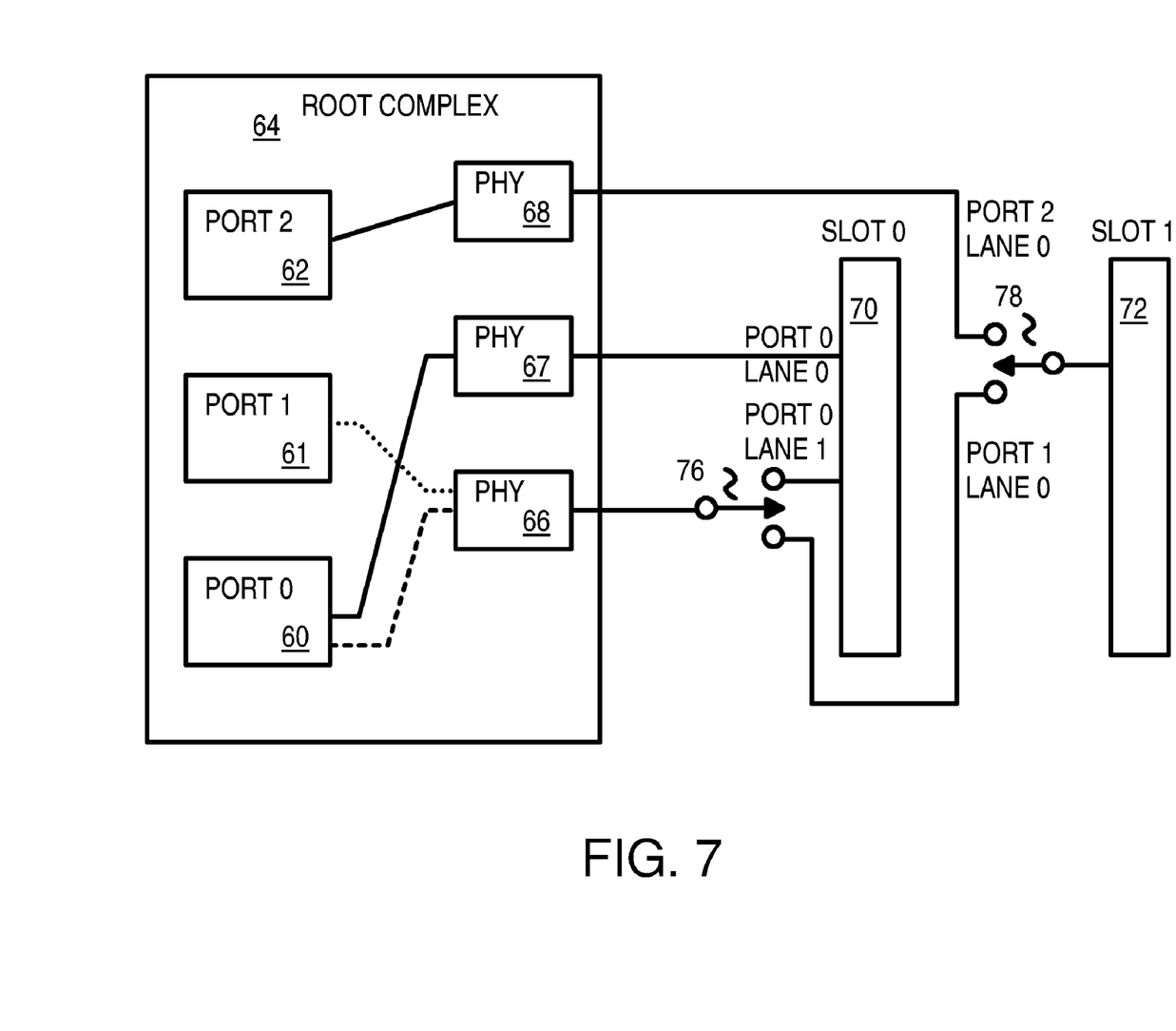
FIG. 7 is a block diagram of allocation of ports and lanes to slots using the parent application.

FIG. 7 is a block diagram of allocation of ports and lanes to slots using the parent application. Root complex 64 can be a PC or other Peripheral Component Interconnect Express (PCIE) host. Programs running on the host communicate through ports such as on a transport layer. Ports 60, 61, 62 are three ports used to communicate to PCIE peripherals in slots 70, 72. Physical-layer signaling such as driving differential signals is accomplished by physical layers 66, 67, 68 that each connect to one or more bidirectional serial-bus lanes.

In this simplified example, 2 lanes may be connected to first slot 70, but only one lane can connect to second slot 72. Logical port 0 and lane 0 are directly connected from root complex 64 to first slot 70, while the lane from physical layer 66 can connect to first slot 70 through switch 76, or to second slot 72 through switches 76, 78. The lane from physical layer 68 can only connect to second slot 72 through switch 78.

In a first configuration, when first slot 70 is allocated one lane and second slot 72 is allocated one lane, port 0 and lane 0 connect directly to first slot 70 using port 60 and physical layer 67. Port 1 and lane 0 connect through switches 76, 78 to second slot 72 using port 61 and physical layer 66.

In a second configuration, when first slot 70 is allocated two lanes and second slot 72 is allocated one lane, port 0 and lane 0 connect directly to first slot 70 using port 60 and physical layer 67. Port 0 and lane 1 connect through switch 76 to first slot 70 using the same port 60 but another physical layer 66. Finally, port 2 lane 0 connects through switch 78 to second slot 72 using port 62 and third physical layer 68. Port 61 is not used.

While only one lane per physical layer 66, 67, 68 has been shown, multiple lanes may be substituted.

Figure 8:
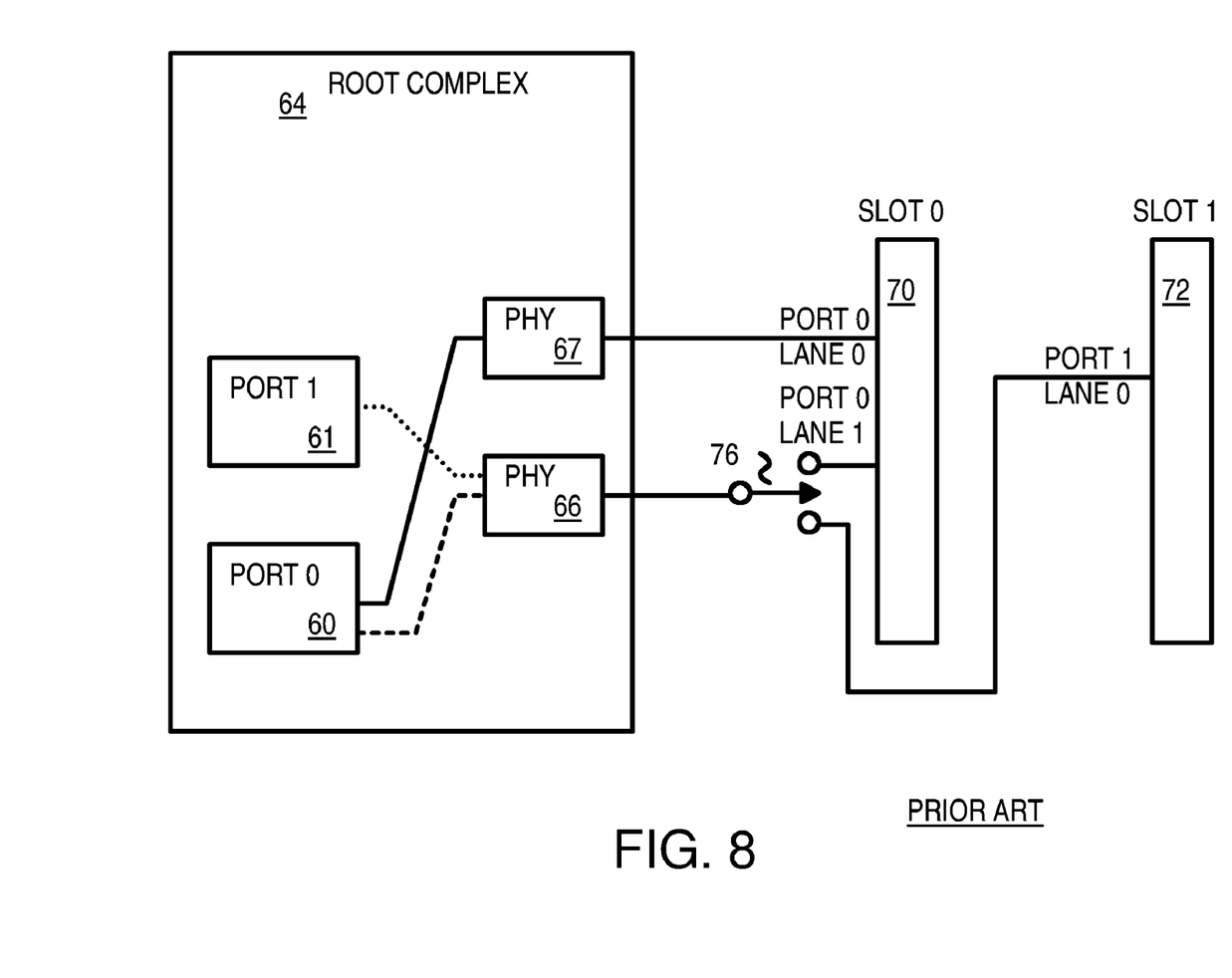
FIG. 8 is a block diagram of prior-art allocation of ports and lanes to slots.

FIG. 8 is a block diagram of prior-art allocation of ports and lanes to slots. Some designs use two ports and two lanes from root complex 64 to slots 70, 72. Ports 60, 61 are two ports used to communicate to PCIE peripherals in slots 70, 72. Physical-layer signaling such as driving differential signals is accomplished by physical layers 66, 67 that each connect to one or more bidirectional serial-bus lanes.

In this example, 2 lanes may be connected to first slot 70, but only one lane can connect to second slot 72. Logical port 0 and lane 0 are directly connected from root complex 64 to first slot 70, while the lane from physical layer 66 can connect to first slot 70 through switch 76, or to second slot 72 through switch 76. A digital mux may be used for switching lanes.

In a first configuration, when first slot 70 is allocated one lane and second slot 72 is allocated one lane, port 0 and lane 0 connect directly to first slot 70 using port 60 and physical layer 67. Port 1 and lane 0 connect through switch 76 to second slot 72 using port 61 and physical layer 66.

In a second configuration, when first slot 70 is allocated two lanes, second slot 72 is allocated no lane and cannot be used. This is a disadvantage of this design. Port 0 and lane 0 connect directly to first slot 70 using port 60 and physical layer 67. Port 0 and lane 1 connect through switch 76 to first slot 70 using the same port 60 but another physical layer 66.

While second slot 72 receives no lanes and is not able to be used when first slot 70 has both lanes, this design is simpler since only one switch 76 is used, saving the cost of second switch 78, third port 62, and third physical layer 68 of FIG. 7.

Figure 9:
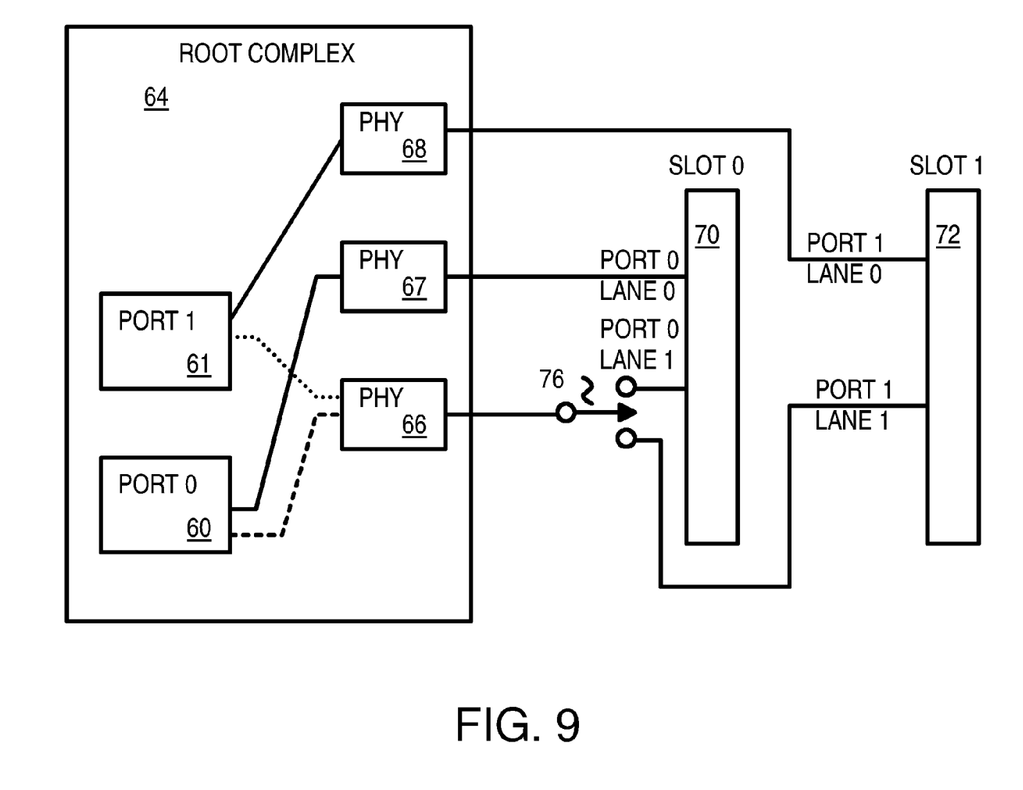
FIG. 9 is a block diagram of improved allocation of ports and lanes to slots according to the present invention.

FIG. 9 is a block diagram of improved allocation of ports and lanes to slots according to the present invention. This design has the advantage of only one switch 76, saving the cost and complexity of second switch 78 and third port 62 of FIG. 7. However, a lane can still be allocated to second slot 72 when first slot 70 is allocated two lanes. Thus second slot 72 can be used when first slot 70 uses its maximum number of lanes.

Less external switching hardware is needed with the invention of FIG. 9 than with FIG. 7. The invention of FIG. 9 still provides the advantage of more complete slot usage, the advantage that the design of FIG. 7 has over the design of FIG. 8.

Root complex 64 can be a PC or other Peripheral Component Interconnect Express (PCIE) host. Programs running on the host communicate through ports such as on a transport layer. Ports 60, 61 are two ports used to communicate to PCIE peripherals in slots 70, 72. Physical-layer signaling such as driving differential signals is accomplished by three physical layers 66, 67, 68 that each connect to one or more bidirectional serial-bus lanes.

In this simplified example, 2 lanes may be connected to first slot 70, and two lanes may be connected to second slot 72, but in different configurations. Logical port 0 and lane 0 are directly connected from root complex 64 to first slot 70, while the lane from physical layer 66 can connect to first slot 70 through switch 76, or to second slot 72 through switch 76. The lane from physical layer 68 can only connect to second slot 72. The lane from physical layer 68 connects directly to second slot 72 without any switches.

In a first configuration, when first slot 70 is allocated one lane and second slot 72 is allocated one lane, port 0 and lane 0 connect directly to first slot 70 using port 60 and physical layer 67. Port 1 and lane 0 connect directly to second slot 72 using port 61 and third physical layer 68.

In a second configuration, when first slot 70 is allocated two lanes and second slot 72 is allocated one lane, port 0 and lane 0 connect directly to first slot 70 using port 60 and physical layer 67. Port 0 and lane 1 connect through switch 76 to first slot 70 using the same port 60 but another physical layer 66. Finally, port 1 lane 0 connects directly to second slot 72 using port 61 and third physical layer 68.

The design of FIG. 9 has an advantage over the designs of FIGS. 7, 8. A third configuration may be used with FIG. 9. Two lanes can be allocated to second slot 72 while one lane is allocated to first slot 70. This configuration is not available for the designs of FIGS. 7, 8 since these have only one physical lane to second slot 72.

In the third configuration, when first slot 70 is allocated one lane and second slot 72 is allocated two lanes, port 0 and lane 0 connect directly to first slot 70 using port 60 and physical layer 67. Port 1 lane 0 connects directly to second slot 72 using port 61 and third physical layer 68. Port 1 and lane 1 connect through switch 76 to second slot 72 using the same port 61 but another physical layer 66.

While only one lane per physical layer 66, 67, 68 has been shown, multiple lanes may be substituted. For example, physical layers 67, 68 can have one lane each, while physical layer 66 and switch 76 have 3 lanes. Then for the second configuration first slot 70 can have 4 lanes (1+3) and second slot 72 can have 1 lane (a 4:1 configuration). For the third configuration first slot 70 can have 1 lane and second slot 72 can have 4 lanes (a 1:4 configuration).

Alternately, root complex 64 can be designed to have 4 lanes for each of physical layers 67, 68, while physical layer 66 and switch 76 have 8 lanes. Then for the second configuration first slot 70 can have 12 lanes (4+8) and second slot 72 can have 4 lanes (a 12:4 configuration). For the third configuration first slot 70 can have 4 lanes and second slot 72 can have 12 lanes (a 4:12 configuration). The first configuration becomes a 4:4 configuration, with 4 lanes for first slot 70, and four lanes for second slot 72.

Figure 10:
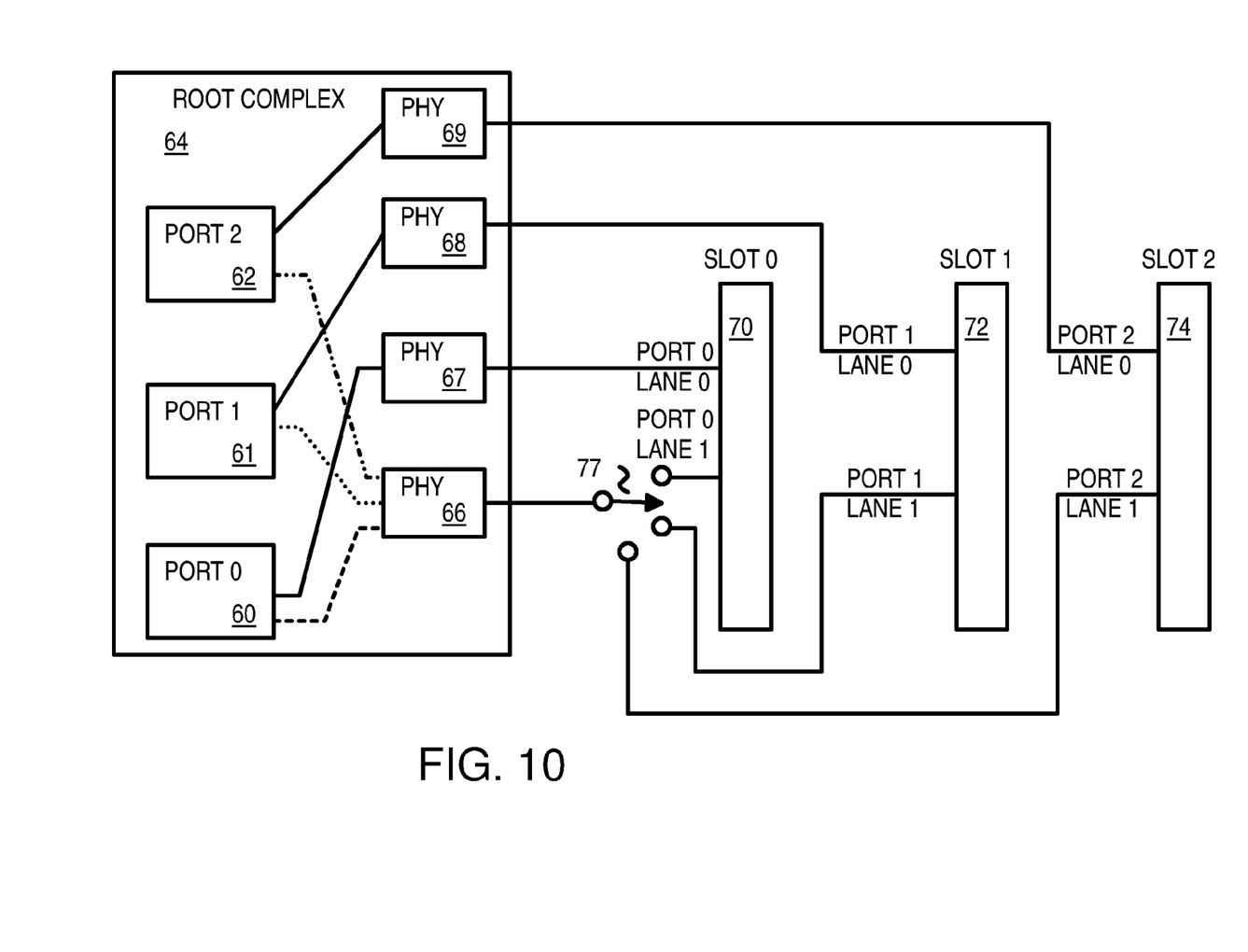
FIG. 10 shows using four physical layers for 3 slots.

FIG. 10 shows using four physical layers for 3 slots. More than two slots can be supported, allowing for more PCIE peripheral devices to be installed. Some slots may be empty while others are occupied, depending on which slots have cards inserted. A user can add more cards later, causing root complex 64 to detect the new card and re-configure lane allocation.

In this example, third slot 74 uses port 2, while second slot 72 uses port 1 and first slot 70 uses port 0. First port 60 connects to all lanes for first slot 70. Second port 61 connects to all lanes for second slot 72. Third port 62 connects to all lanes for third slot 74.

Four physical layers 66, 67, 68, 69 can connect to ports 60, 61, 62. Physical layers 67, 68, 69 connect directly to slots 70, 72, 74, respectively, as lane 0 of each slot's port. Physical layer 66 connects to switch 77, which then connects to slots 70, 72, 74. Switch 77 can be a 3-way switch in this embodiment.

In a first configuration, first slot 70 is allocated one lane, second slot 72 is allocated one lane, and third slot 74 is allocated one lane. Port 0 and lane 0 connect directly to first slot 70 using port 60 and physical layer 67. Port 1 and lane 0 connect directly to second slot 72 using port 61 and third physical layer 68. Port 2 and lane 0 connect directly to third slot 74 using port 62 and physical layer 69.

In a second configuration, first slot 70 is allocated two lanes, second slot 72 is allocated one lane, and third slot 74 is allocated one lane. Port 0 and lane 0 connect directly to first slot 70 using port 60 and physical layer 67. Port 0 and lane 1 connect through switch 77 to first slot 70 using the same port 60 but another physical layer 66. Port 1 lane 0 connects directly to second slot 72 using port 61 and third physical layer 68. Finally, port 2 lane 0 connects directly to third slot 74 using port 62 and fourth physical layer 69.

In a third configuration, when first slot 70 and third slot 74 are each allocated one lane, and second slot 72 is allocated two lanes, port 0 and lane 0 connect directly to first slot 70 using port 60 and physical layer 67. Port 1 lane 0 connects directly to second slot 72 using port 61 and third physical layer 68. Port 1 and lane 1 connect through switch 77 to second slot 72 using the same port 61 but another physical layer 66. Port 2 lane 0 connects directly to third slot 74 using port 62 and fourth physical layer 69.

In a fourth configuration, first slot 70 and second slot 72 are each allocated one lane, and third slot 74 is allocated two lanes. Port 0 and lane 0 connect directly to first slot 70 using port 60 and physical layer 67. Port 1 lane 0 connects directly to second slot 72 using port 61 and third physical layer 68. Port 2 lane 0 connects directly to third slot 74 using port 62 and fourth physical layer 69. Port 2 and lane 1 connect through switch 77 to third slot 74 using the same port 62 but another physical layer 66.

Figure 11:
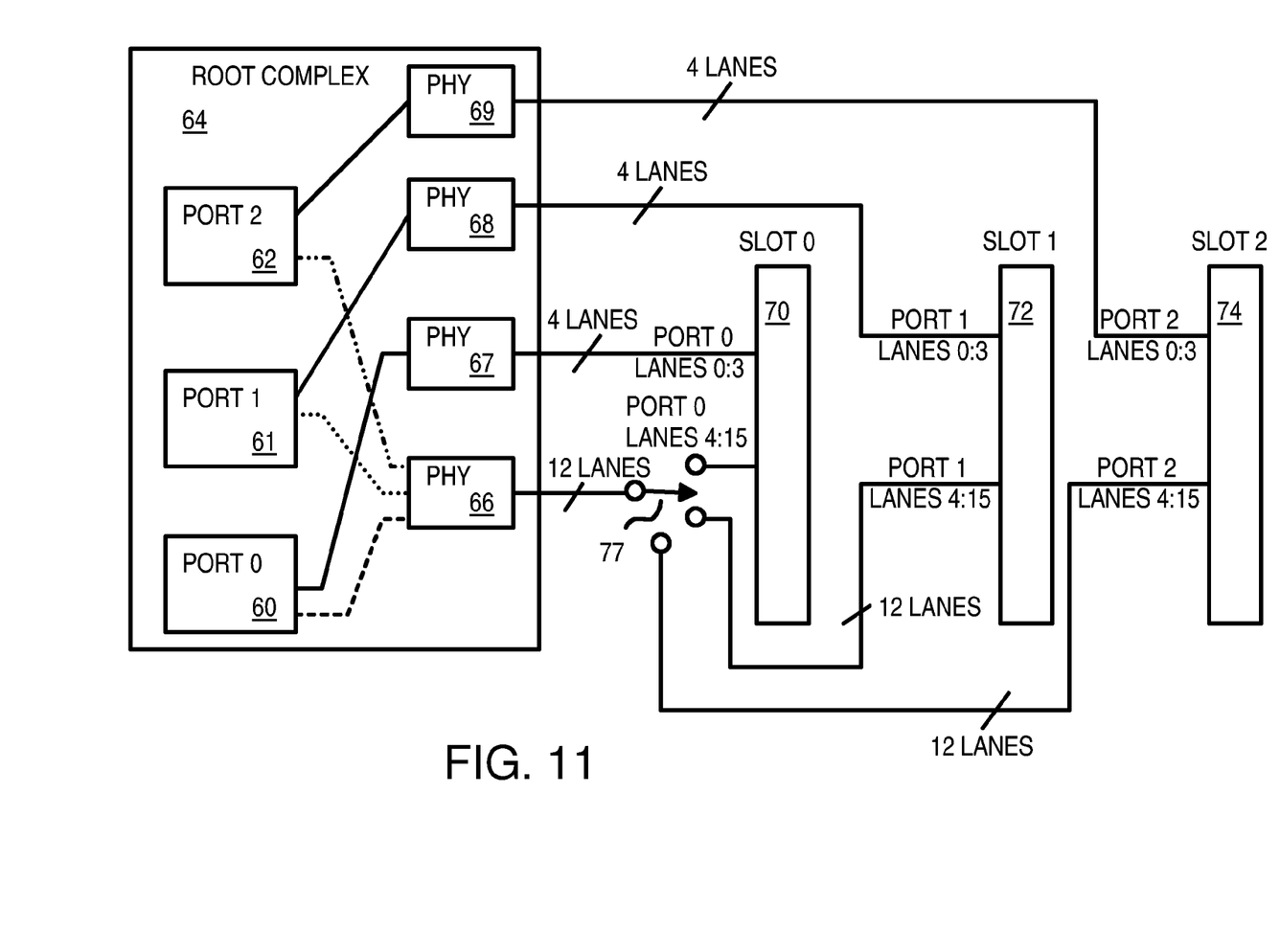
FIG. 11 shows using four direct lanes and 12 configurable lanes for 3 slots.

FIG. 11 shows using four direct lanes and 12 configurable lanes for 3 slots. While only one lane per physical layer 66, 67, 68, 69 was shown in FIG. 10, multiple lanes may be substituted. Some lanes are directly connected to slots while other lanes are configurable. Configurable lanes are driven by physical layer 66 and pass through switch 77 and can be configured to connect to any of slots 70, 72, 74.

In this embodiment, third slot 74 uses port 2, second slot 72 uses port 1, and first slot 70 uses port 0. First port 60 connects to all lanes for first slot 70. Second port 61 connects to all lanes for second slot 72. Third port 62 connects to all lanes for third slot 74.

Four physical layers 66, 67, 68, 69 can connect to ports 60, 61, 62. Each of direct physical layers 67, 68, 69 has four lanes, while configurable physical layer 66 has 12 lanes.

Direct physical layers 67, 68, 69 connect directly to slots 70, 72, 74, respectively, as lanes 0:3 of each slot's port. Configurable physical layer 66 has 12 lanes that connect to switch 77, which is 12 lanes wide and connects to slots 70, 72, 74 as lanes 4:15. Switch 77 can be a 3-way switch in this embodiment.

In a first configuration, first slot 70 is allocated four lanes, second slot 72 is allocated four lanes, and third slot 74 is allocated four lanes. Port 0 and lanes 0:3 connect directly to first slot 70 using port 60 and physical layer 67. Port 1 and lanes 0:3 connect directly to second slot 72 using port 61 and third physical layer 68. Port 2 and lanes 0:3 connect directly to third slot 74 using port 62 and physical layer 69. Lanes 4:15 are unused.

In a second configuration, first slot 70 is allocated 16 lanes, second slot 72 is allocated four lanes, and third slot 74 is allocated four lanes. Port 0 lanes 0:3 connect directly to first slot 70 using port 60 and physical layer 67. Port 0 lanes 4:15 connect through switch 77 to first slot 70 using the same port 60 but another physical layer 66. Port 1 lanes 0:3 connect directly to second slot 72 using port 61 and third physical layer 68. Finally, port 2 lanes 0:3 connect directly to third slot 74 using port 62 and fourth physical layer 69.

In a third configuration, when first slot 70 and third slot 74 are each allocated four lanes, and second slot 72 is allocated sixteen lanes, port 0 lanes 0:3 connect directly to first slot 70 using port 60 and physical layer 67. Port 1 lanes 0:3 connect directly to second slot 72 using port 61 and third physical layer 68. Port 1 lanes 4:15 connect through switch 77 to second slot 72 using the same port 61 but another physical layer 66. Port 2 lanes 0:3 connect directly to third slot 74 using port 62 and fourth physical layer 69.

In a fourth configuration, first slot 70 and second slot 72 are each allocated four lanes, and third slot 74 is allocated sixteen lanes. Port 0 lanes 0:3 connect directly to first slot 70 using port 60 and physical layer 67. Port 1 lanes 0:3 connect directly to second slot 72 using port 61 and third physical layer 68. Port 2 lanes 0:3 connect directly to third slot 74 using port 62 and fourth physical layer 69. Port 2 lanes 4:15 connect through switch 77 to third slot 74 using the same port 62 but another physical layer 66.

Some of the lanes could be unused. For example, in the fourth configuration, third slot 74 might have a peripheral that supports only 8 lanes. Then only lanes 0:7 are used for port 2. Lanes 8:15 are unused, but can still be allocated and connected to third slot 74. Many other configurations are possible with the design of FIG. 11, such as 4:4:12, 1:4:12, 1:1:12, 1:1:8, 1:2:4, 4:2:1, 16:4:2, etc.

Figure 12:
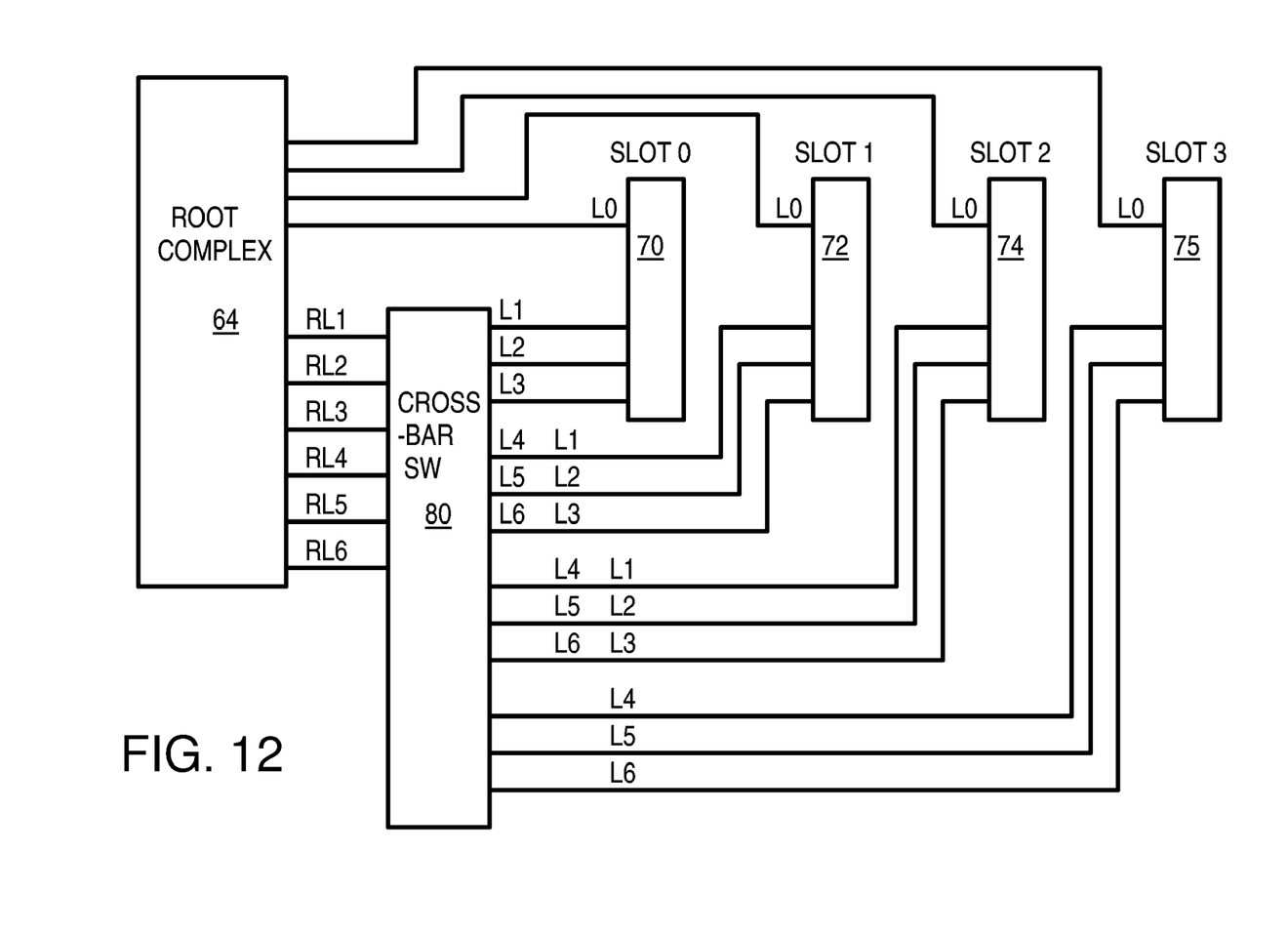
FIG. 12 shows a four-slot embodiment with a crossbar switch for configurable lanes.

FIG. 12 shows a four-slot embodiment with a crossbar switch for configurable lanes. Rather than use a switch or a 1:3 mux, a more complex crossbar switch may be substituted. Crossbar switch 80 allows for more complex connections of lanes to be made. Rather than have just one configurable lane from root complex 64, several configurable lanes RL1, RL2, RL3, ... RL6 are output from configurable physical layers in root complex 64 to crossbar switch 80. Rather than switching all configurable lanes to the same slot, as described in FIGS. 9-11, configurable lanes may be simultaneously switched to different slots.

In this embodiment, four slots 70, 72, 74, 75 each receive one or more direct lanes from direct physical layers in root complex 64. These direct lanes are designated L0. Each of slots 70, 72, 74, 75 also receives up to three configurable lanes from configurable physical layers in root complex 64. These configurable lanes are switched by crossbar switch 80.

For example, in several configurations each of the four slots receives a direct lane L0 directly from root complex 64. In one of these configurations three configurable lanes L1, L2, L3 are switched from root lanes RL1, RL2, RL3 by crossbar switch 80 to first slot 70, while another three configurable lanes L4, L5, L6 are switched from root lanes RL4, RL5, RL6 by crossbar switch 80 to second slot 72.

In a second one of these configurations three configurable lanes L1, L2, L3 are switched from root lanes RL1, RL2, RL3 by crossbar switch 80 to second slot 72, while another three configurable lanes L4, L5, L6 are switched from root lanes RL4, RL5, RL6 by crossbar switch 80 to third slot 74.

In a third one of these configurations three configurable lanes L1, L2, L3 are switched from root lanes RL1, RL2, RL3 by crossbar switch 80 to third slot 74, while another three configurable lanes L4, L5, L6 are switched from root lanes RL4, RL5, RL6 by crossbar switch 80 to fourth slot 75.

Other configurations could switch three configurable lanes L1, L2, L3 from root lanes RL1, RL2, RL3 to first slot 70, while another three configurable lanes L4, L5, L6 are switched from root lanes RL4, RL5, RL6 by crossbar switch 80 to third slot 74, or to fourth slot 75. Other combinations may also be supported by crossbar switch 80.

Crossbar switch 80 could also switch 1 or 2 lanes to each of the slots, rather than just 3 lanes per slot. Each of the lanes in FIG. 12 could be expanded to a bunch of lanes, such as 4 direct lanes L0 and four configurable lanes L1, four more configurable lanes L2, etc.

ALTERNATE EMBODIMENTS

Several other embodiments are contemplated by the inventor. Many different types of cross bar switches may be used, such as an active mux wherein the signal is also amplified in the cross bar before sending it out. The cross-bar may be a repeater or re-timer mux wherein the digital data is recovered from the physical layer. The digital data may be stored in a memory for the cross-bar, and later read from the memory and latched to the output of the multiplexer. The digital data may also be fed into a digital cross bar, and then latched out through a physical layer differentially. The switch or crossbar may be analog switches such as bus switch transistors, or may be digital or mixed-mode switches. Digital muxing of lanes may be included inside root complex 64. Streams of data bits for transmission at various protocol levels may be routed within root complex 64 to perform muxing or switching. Rather than using a root complex, another host may be used, or another kind of device. Other serial buses besides PCIE may be substituted, such as for other differential-based signaling protocols that permit multiple pairs to form a single lane, such as XAUI used in Ethernet with four pairs. With added protocol support, non-standard-based Ethernet may be used and still transfer Ethernet frames with more or fewer lanes. Current Fiber Channel 10G also uses multiple lanes. With some enhancement to the protocol, the lanes may be changed to be wider or narrower lanes. Other buses with multiple differential serial buses include Hyper Transport used by Advanced Micro Devices. Infiniband or RapidIO may be enhanced with the invention. The invention may be used with multiple lanes that form a single link connecting two end devices, such as a root complex and a network card. Current single lane protocols such as SAS and SATA may also be enhanced with multiple lanes for higher performance, and the invention may then be applied. Ethernet supports link aggregation, so multiple Ethernet wires can be formed into a single trunk, or link. The cross-bar switch can also be used to distribute bandwidth by allocating Ethernet lanes between devices.

Slots may also support 32 lanes or more, or may support 16, 8, or 4 lanes per slot, or some other lane combinations. The switches or bus switches can be integrated together on one or more integrated circuit devices, or could be integrated together with a PCIE switch chip or a PCIE root complex chip. Control signals for the bus switches may be shared or separate. Special bus-switch devices that provide extra isolation in the event of undershoots or overshoots on the serial-bus lines may be used. See for example U.S. Pat. Nos. 6,034,553, 6,075,400, 6,052,019, 6,559,703, 6,320,408 and others assigned to the present assignee, Pericom Semiconductor Corp. of San Jose, Calif.

A switch controller can be programmed by configuration software to enable transistor bus switches or the crossbar to allocate and connect configurable host lanes to slot lanes. Peripherals can have 1, 2, 4, 8, 12, or 16 lanes allocated and may be inserted into any of the slots in one embodiment.

Additional peripheral slots and additional lanes may be provided for by extensions of the simple examples disclosed herein. Some switches could select between slots 1, 2, and slots 3,4 in a four-slot system. Many other extensions are possible, such as having 2 configurable sets of lanes, one set for every 2 slots. Slots are interfaces that can use edge or other connectors for removable peripheral cards or removable cable connectors to peripherals. Some slots may have permanently or semi-permanently installed peripherals. A switch controller can be programmed by configuration software or firmware to enable transistor bus switches in the partial cross-bar switching matrix to allocate and connect host lanes to slot lanes.

While some peripherals have been described as high-priority or low-priority, priority may not be determinate but rather be subjective. Different peripherals may have different bandwidth requirements. Sometimes all bandwidth requirements may be met, and priority does not matter. In other situations, the number of lanes may be limited and one peripheral may not receive its full bandwidth because another peripheral is deemed more important, or was randomly chosen to have a higher priority.

Additional transistors may be added for the additional connections. Rather than use n-channel transistor switches, p-channel transistor switches or transmission gate (p and n transistors in parallel) could be substituted. While the term cross-bar has been used, it is not necessarily a full cross-bar switch since not all possible cross-connections need to be implemented.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claims elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A re-configurable bus system comprising:
a host interface to a host;
a physical-layer switch;
a first slot for receiving a first peripheral device;
a second slot for receiving a second peripheral device;
a first direct lane between the host interface and the first slot;
a second direct lane between the host interface and the second slot;
configurable lanes between the host interface and the physical-layer switch;
wherein each of the first direct lane, the second direct lane, and the configurable lanes is a bi-directional serial bus;
first configurable lanes between the physical-layer switch and the first slot; and second configurable lanes between the physical-layer switch and the second slot;

wherein the physical-layer switch can be configured into a first configuration wherein the configurable lanes connect to the first configurable lanes to the first slot, the first direct lane connects to the first slot, and the second direct lane connects to the second slot;

wherein the physical-layer switch can be configured into a second configuration wherein the configurable lanes connect to the second configurable lanes to the second slot, the second direct lane connects to the second slot, and the first direct lane connects to the first slot.

2. The re-configurable bus system of claim 1 wherein the host interface further comprises:
    a first port for communicating with the first peripheral device in the first slot using a higher-level protocol;
    a first direct physical layer for sending and receiving physical signals over the first direct lane and communicating with the first port;
    a second port for communicating with the second peripheral device in the second slot using the higher-level protocol;
    a second direct physical layer for sending and receiving physical signals over the second direct lane and communicating with the second port; and
    a configurable physical layer for sending and receiving physical signals over the configurable lanes and for communicating with the first port when the physical-layer switch is configured into the first configuration and for communicating with the second port when the physical-layer switch is configured into the second configuration.

3. The re-configurable bus system of claim 2 wherein the physical-layer switch can be configured into a partitioned configuration wherein the configurable lanes are partitioned among the first configurable lanes and the second configurable lanes.

4. The re-configurable bus system of claim 2 wherein the first direct lane, the second direct lane, the configurable lanes, the first configurable lanes and the second configurable lanes each comprise one or more Peripheral Component Interconnect Express (PCIE) serial buses having two differential pairs.

5. The re-configurable bus system of claim 2 wherein the configurable lanes comprise $2^N-1$ lanes, wherein N is a whole number of 2 or more;
    wherein the first direct lane comprises exactly one lane;
    whereby a total number of lanes from the host to the first slot is exactly $2^N$ lanes in the first configuration.

6. The re-configurable bus system of claim 2 wherein the first peripheral device may be inserted into the first slot or into the second slot,
    whereby peripherals in slots are interchangeable to other slots.

7. The re-configurable bus system of claim 2 wherein each of the configurable lanes, the first direct lane, and the second direct lane is a bi-directional serial bus having a transmit differential pair of data lines and a receive differential pair of data lines, wherein the host transmits data over the transmit differential pair and receives data over the receive differential pair.

8. The re-configurable bus system of claim 7 wherein the physical-layer switch comprises a plurality of bus-switch transistors that are selectively enabled to connect configurable lanes to the first and second configurable lanes in response to configuration signals.

9. The re-configurable bus system of claim 6 wherein the physical-layer switch can be configured into a split configuration wherein the configurable lanes are partitioned equally among the first and second slot.

10. The re-configurable bus system of claim 6 wherein the physical-layer switch can be configured into a shifted configuration wherein the configurable lanes are partitioned non-equally among the first and second slot.

11. The re-configurable bus system of claim 6 further comprising:
    a third slot for receiving a third peripheral device;
    a third direct lane between the host interface and the third slot;
    wherein the third direct lane is a bi-directional serial bus; and
    third configurable lanes between the physical-layer switch and the third slot;
    wherein the physical-layer switch can be configured into a third configuration wherein the configurable lanes connect to the third configurable lanes to the third slot, the first direct lane connects to the first slot, the second direct lane connects to the second slot, and the third direct lane also connects to the third slot.

12. The re-configurable bus system of claim 8 further comprising:
    a switch controller, responsive to execution of a lane-allocation routine, for generating the configuration signals to the physical-layer switch.

13. The re-configurable bus system of claim 11 wherein the host interface further comprises:
    a third port for communicating with the third peripheral device in the third slot using the higher-level protocol;
    a third direct physical layer for sending and receiving physical signals over the third direct lane and communicating with the third port; and
    wherein the configurable physical layer is further for sending and receiving physical signals over the configurable lanes and for communicating with the third port when the physical-layer switch is configured into the third configuration.

14. A serial-bus allocator comprising:
    a plurality of slots for accepting peripherals, including a first slot and a second slot;
    a first direct lane directly connected from a host to the first slot;
    a second direct lane directly connected from the host to the second slot;
    an external switch between the host and the first slot and the second slot;
    a plurality of configurable host lanes connected between the host and the external switch, the plurality of configurable host lanes being allocatable among the plurality of slots by the external switch;
    wherein the plurality of configurable host lanes comprises $2^N-1$ lanes or a multiple of $2^N-1$ lanes, wherein N is a whole number of 2 or more;
    wherein each lane has a transmit differential pair of data lines and a receive differential pair of data lines;
    wherein the first slot can accept a first peripheral that is configured for 1, 4, or 8 lanes;
    wherein the second slot can accept a second peripheral that is configured for 1, 4, or 8 lanes;
    wherein each lane is a Peripheral Component Interconnect Express (PCIE) bus having two differential pairs of data lines.

15. The serial-bus allocator of claim 14 wherein the external switch comprises transistors connecting serial-bus segments in the plurality of configurable host lanes to serial-bus segments to the plurality of slots;

wherein the external switch is configured for a first maximum configuration by enabling the transistors to connect $2^N-1$ lanes of the plurality of configurable host lanes to the first slot, wherein the second direct lane connects to the second slot;

wherein the external switch is configured for a second maximum configuration by enabling the transistors to connect $2^N-1$ lanes of the plurality of configurable host lanes to the second slot, wherein the first direct lane connects to the first slot.

16. The serial-bus allocator of claim 15 wherein the external switch is configured for a split configuration by enabling the transistors to connect a first set of the plurality of configurable host lanes to the first slot, and by enabling the transistors to connect a second set of the plurality of configurable host lanes to the second slot.

17. The serial-bus allocator of claim 16 wherein the first slot can accept a first peripheral that is configured for 1, 4, 8, 12, or 16 lanes;

wherein the second slot can accept a second peripheral that is configured for 1, 4, 8, 12, or 16 lanes;

wherein the external switch is configurable for (X+1,Y+1) configurations, wherein X is a number of configurable lanes allocated to the first slot, and wherein Y is a number of configurable lanes allocated to the second slot, wherein configurations include (16,1), (12,4), (8,8), (4,12), and (1,16).

18. A configurable lane-allocating system comprising:

host computer means for controlling bus transactions;

host lanes for carrying serial data to and from the host computer means, wherein the host lanes comprise first direct lanes, second direct lanes, and configurable host lanes;

first slot means for connecting the first direct lanes and first configurable lanes to a first peripheral;

second slot means for connecting the second direct lanes and second configurable lanes to a second peripheral;

switching means, coupled between the configurable host lanes and the first configurable lanes and the second configurable lanes, for forming switch connections;

wherein each of the configurable host lanes, each of the first direct lanes, and each of the second direct lanes comprises lane means for carrying differential data in two directions;

first configuration means, in the switching means, for forming switch connections that connect lane-positions of the configurable host lanes to lane-positions of the first configurable lanes for a first maximum configuration; and second configuration means, in the switching means, for forming switch connections that connect lane-positions of the configurable host lanes to lane-positions of the second configurable lanes for the second maximum configuration.

19. The configurable lane-allocating system of claim 18 further comprising:

first port means for communicating to the first peripheral in the first slot;

first direct physical layer means for sending and receiving physical signals over the first direct lanes in response to the first port means;

second port means for communicating to the second peripheral in the second slot;

second direct physical layer means for sending and receiving physical signals over the second direct lanes in response to the second port means; and configurable physical layer means for sending and receiving physical signals over the configurable host lanes in response to the first port means when the first maximum configuration is active and the switching means connects the configurable host lanes to the first configurable lanes, and in response to the second port means when the second maximum configuration is active and the switching means connects the configurable host lanes to the second configurable lanes.

* * * * *